(12) United States Patent
Dey et al.

(10) Patent No.: US 10,968,671 B2
(45) Date of Patent: Apr. 6, 2021

(54) ADJUSTABLE VEHICLE HINGE ASSEMBLY

(71) Applicants: Nissan North America, Inc., Franklin, TN (US); NISSAN MOTOR CO., LTD., Yokohama (JP)

(72) Inventors: Debraj Dey, Novi, MI (US); Scott Watson, Novi, MI (US); David Kovie, Livonia, MI (US); Ryohei Moriya, Kanagawa (JP)

(73) Assignees: Nissan North America, Inc., Franklin, TN (US); Nissan Motor Co., Ltd., Kanagawa (JP)

( * ) Notice: Subject to any disclaimer, the term of this patent is extended or adjusted under 35 U.S.C. 154(b) by 210 days.

(21) Appl. No.: 15/612,183

(22) Filed: Jun. 2, 2017

(65) Prior Publication Data

US 2018/0347246 A1    Dec. 6, 2018

(51) Int. Cl.
| | |
|---|---|
| *E05D 11/00* | (2006.01) |
| *B60J 5/04* | (2006.01) |
| *E05D 3/14* | (2006.01) |
| *E05D 7/04* | (2006.01) |

(52) U.S. Cl.
CPC ............ *E05D 11/00* (2013.01); *B60J 5/0479* (2013.01); *E05D 3/147* (2013.01); *E05D 7/0423* (2013.01); *E05D 2007/0461* (2013.01); *E05Y 2201/224* (2013.01); *E05Y 2900/531* (2013.01)

(58) Field of Classification Search
CPC ....... E05D 11/00; E05D 3/147; E05D 7/0423; E05D 7/0415; E05D 7/043; E05D 2007/0461; E05D 2007/0438; E05D 2007/0446; E05D 2007/0453; B60J 5/0479; E05Y 2900/531; E05Y 2201/224; Y10T 16/532; Y10T 16/5321; Y10T 16/5322; Y10T 16/53225; Y10T 16/5323;
(Continued)

(56) References Cited

U.S. PATENT DOCUMENTS

| | | | |
|---|---|---|---|
| 2,870,477 A | * | 1/1959 | Anthony ................ E05D 3/127 16/321 |
| 2,880,956 A | | 4/1959 | Beckstett |
| 4,490,884 A | | 1/1985 | Vickers |

(Continued)

FOREIGN PATENT DOCUMENTS

EP    1570147 B1    6/2006

*Primary Examiner* — Joseph D. Pape
*Assistant Examiner* — Dana D Ivey
(74) *Attorney, Agent, or Firm* — Global IP Counselors, LLP (57) ABSTRACT

A hinge assembly for a vehicle closure panel includes a body mounting member configured to mount the hinge assembly to a vehicle body, a closure panel mounting member configured to mount the hinge assembly to the vehicle closure panel and a hinge connecting arm pivotally connected by a first pivotal connection at a first end to the body mounting member and pivotally connected by a second pivotal connection at a second end to the closure panel mounting member. A first fastening member is movably received by the closure panel mounting member. A first stop member limits movement of the first fastening member in a first direction toward the closure panel mounting member. A second stop member limits movement of the first fastening member in a second direction away from the closure panel mounting member.

20 Claims, 10 Drawing Sheets

(58) Field of Classification Search
CPC ........... Y10T 16/53235; Y10T 16/5324; Y10T 16/53253; Y10T 16/53257
USPC ................ 296/146.11, 146.12; 292/DIG. 73; 16/236, 237, 238, 239, 240, 242, 245, 16/246, 374, 375
See application file for complete search history.

(56) References Cited

U.S. PATENT DOCUMENTS

| | | |
|---|---|---|
| 7,032,953 B2 | 4/2006 | Rangnekar et al. |
| 7,334,293 B2 | 2/2008 | Erickson et al. |
| 7,636,985 B2 | 12/2009 | Greenbank |
| 8,007,026 B2 * | 8/2011 | Scott ....................... E05D 3/127 296/146.12 |
| 8,651,556 B2 * | 2/2014 | Cutting ................ E05C 17/203 16/82 |
| 9,562,382 B2 | 2/2017 | Dey |

* cited by examiner

ADJUSTABLE VEHICLE HINGE ASSEMBLY

BACKGROUND

Field of the Invention

The present invention generally relates to an adjustable vehicle hinge assembly. More specifically, the present invention relates to an adjustable hinge assembly for a vehicle closure panel.

Background Information

Many current vehicles include a hinge assembly to pivotally mount a closure panel to a vehicle body. During manufacturing of the vehicle, properly mounting the closure panel such that the closure panel is flush with the vehicle body is difficult. Accordingly, a need exists for an adjustable vehicle hinge assembly that facilitates obtaining flushness of the vehicle closure panel with the vehicle body.

SUMMARY

In view of the state of the known technology, one aspect of the present invention includes a hinge assembly for a vehicle closure panel including a body mounting member configured to mount the hinge assembly to a vehicle body, a closure panel mounting member configured to mount the hinge assembly to the vehicle closure panel and a hinge connecting arm pivotally connected by a first pivotal connection at a first end to the body mounting member and pivotally connected by a second pivotal connection at a second end to the closure panel mounting member. A first fastening member is movably received by the closure panel mounting member. A first stop member limits movement of the first fastening member in a first direction toward the closure panel mounting member. A second stop member limits movement of the first fastening member in a second direction away from the closure panel mounting member.

Another aspect of the present invention includes a vehicle body structure including a vehicle body, a closure panel pivotally mounted to the vehicle body, and a hinge assembly for pivotally mounting the closure panel to the vehicle body. The hinge assembly includes a body mounting member configured to mount the hinge assembly to the vehicle body, a closure panel mounting member configured to mount the hinge assembly to the vehicle closure panel, and a hinge connecting arm pivotally connected by a first pivotal connection at a first end to the body mounting member and pivotally connected by a second pivotal connection at a second end to the closure panel mounting member. A first fastening member is movably received by the closure panel mounting member such that movement of the first fastening member with respect to the closure panel mounting member adjusts a position of the closure panel with respect to the vehicle body. A first stop member limits movement of the first fastening member in a first direction toward the closure panel mounting member. A second stop member limits movement of the first fastening member in a second direction away from the closure panel mounting member.

Also other objects, features, aspects and advantages of the disclosed adjustable vehicle hinge assembly will become apparent to those skilled in the art from the following detailed description, which, taken in conjunction with the annexed drawings, discloses exemplary embodiments of the adjustable vehicle hinge assembly.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawing figures. It will be apparent to those skilled in the art from this disclosure that the following descriptions of the exemplary embodiments are provided for illustration only and not for the purpose of limiting the invention as defined by the appended claims and their equivalents.

Figure 1:
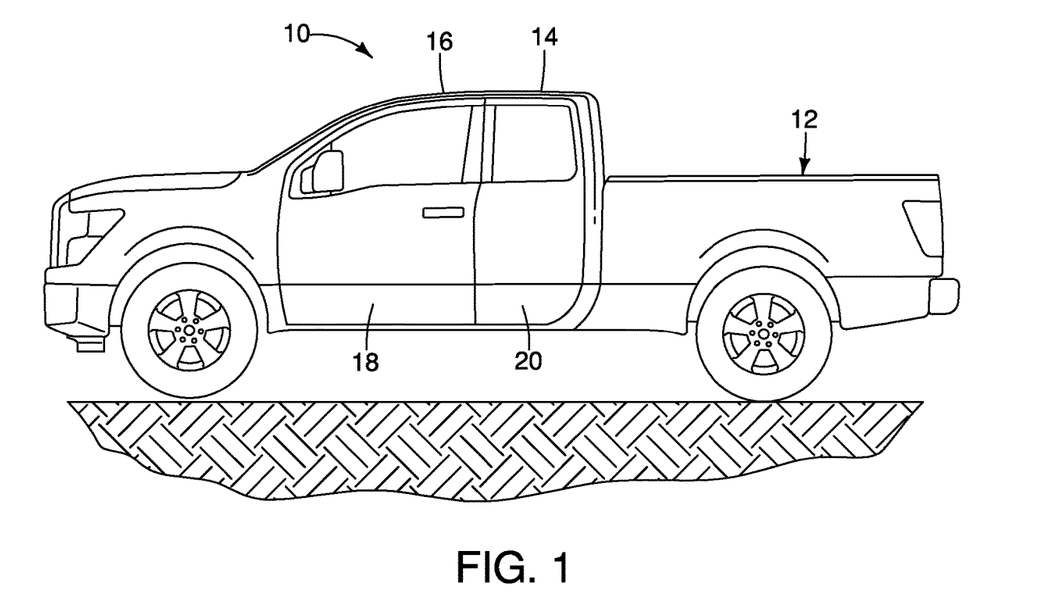
FIG. 1 is a side elevational view of a vehicle having a pivotally mounted closure panel in accordance with an exemplary embodiment of the present invention.
Figure 2:
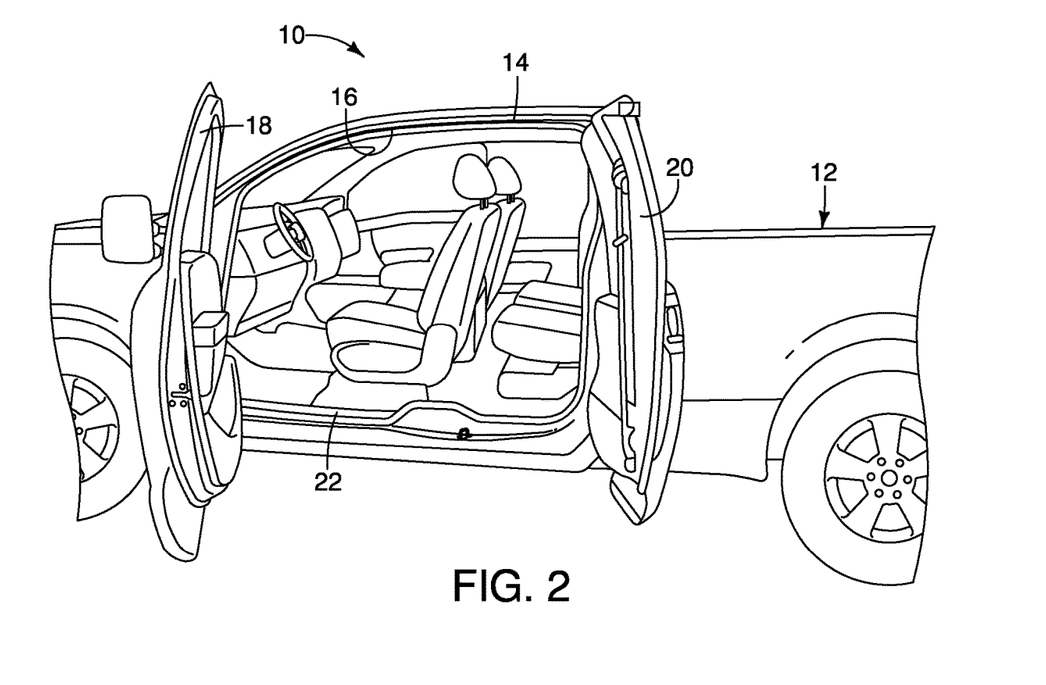
FIG. 2 is a side elevational view of the vehicle of FIG. 1 with the closure panel pivoted to an intermediate open position.
Figure 3:
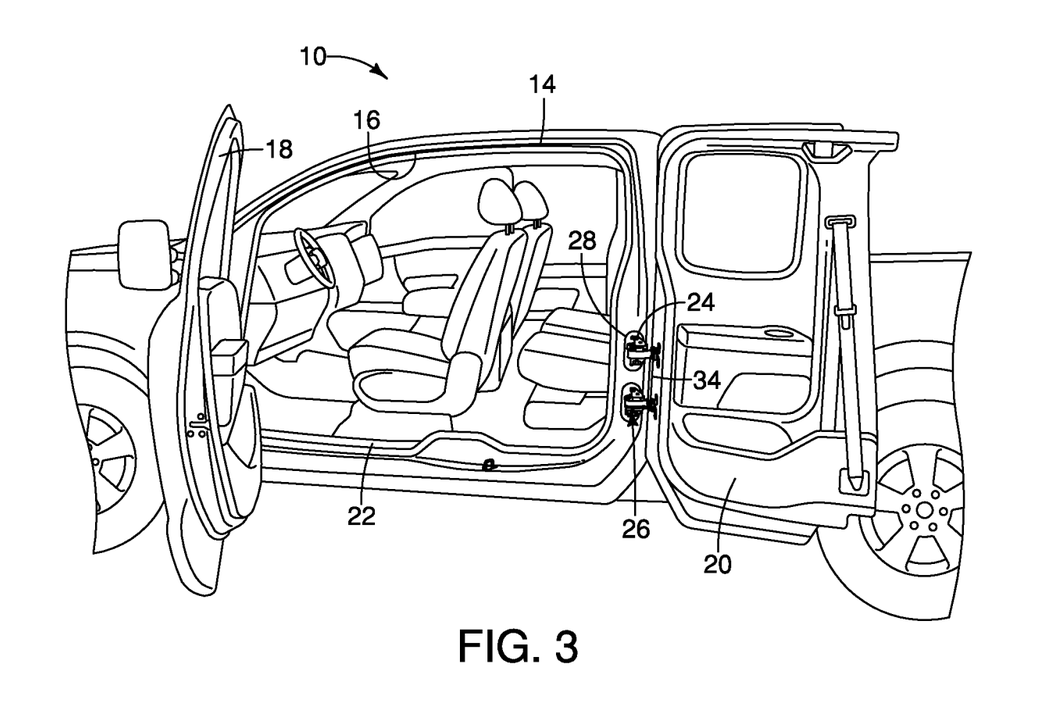
FIG. 3 is a side elevational view of the vehicle of FIGS. 1 and 2 with the closure panel pivoted to a fully open position.

Referring initially to FIGS. 1-3, a vehicle 10 is illustrated in accordance with an exemplary embodiment of the present invention. The vehicle 10 includes a frame mounted vehicle body 12 that is configured and arranged to be mounted to a chassis or frame (not shown). The vehicle 10 is illustrated as a pick-up truck. However, it will become apparent to those skilled in the art from the following detailed description that the present invention can be applied to other types of vehicles. Thus, the vehicle 10 will not be discussed or illustrated in detail herein, except to the extent that the parts of the vehicle 10 relate to the present invention.

The vehicle body 12 has a vehicle cabin structure 14 with a pair of side body portions 16, a pair of front closure panels 18 and a pair of rear closure panels 20. The front closure panels 18 are pivotally coupled to a front portion of the side body portion 16, while the rear closure panels 20 are pivotally coupled to a rear portion of the side body portion 16 as discussed below. The right and left sides of the vehicle cabin structure 14 are essentially mirror images as to the structures that relate to present invention, such that only the driver's side of the vehicle 10 is discussed and/or illustrated in detail herein.

The side body portion 16 is preferably constructed of a plurality of metallic sheet materials that are configured and arranged to define the overall shape of a side of the cabin structure 14. Preferably, the side body portion 16 is configured and arranged to form an annular door ledge 22 for receiving and supporting the front and rear closure panels 18 and 20, when the front and rear closure panels 18 and 20 are in the closed position. Because the particular construction of the front closure panel 18 and the associated vehicle body structures are conventional and well known in the art, the front closure panel 18 and the associated vehicle body structures are not be discussed and/or illustrated in further detail herein. Rather, the following description of the vehicle focuses on the structure of the vehicle 10 that relates to the rear closure panel 20.

Preferably, the side body portion 16 has a rear door mounting pillar 24 disposed at the rear end of the annular door ledge 22. The rear door mounting pillar 24 hingedly supports the rear closure panel 20 for pivoting towards the rear of the vehicle 10 from a closed position to a fully open position about a vertically arranged pivot axis as illustrated in FIGS. 2 and 3.

Figure 8:
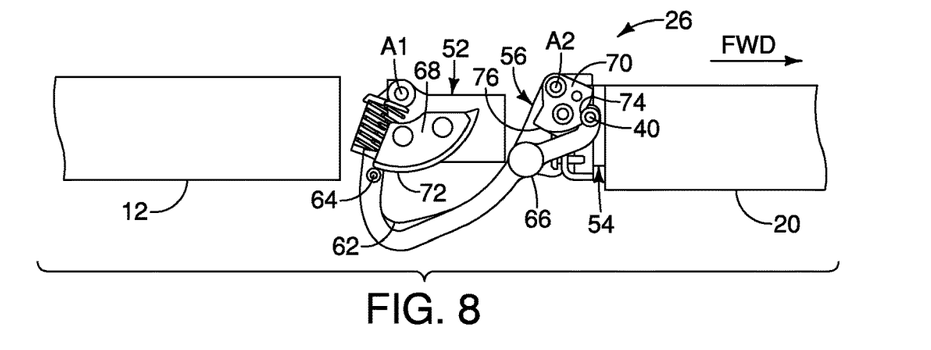
FIG. 8 is a top plan view of the adjustable hinge assembly with a closure panel in a closed position.
Figure 9:
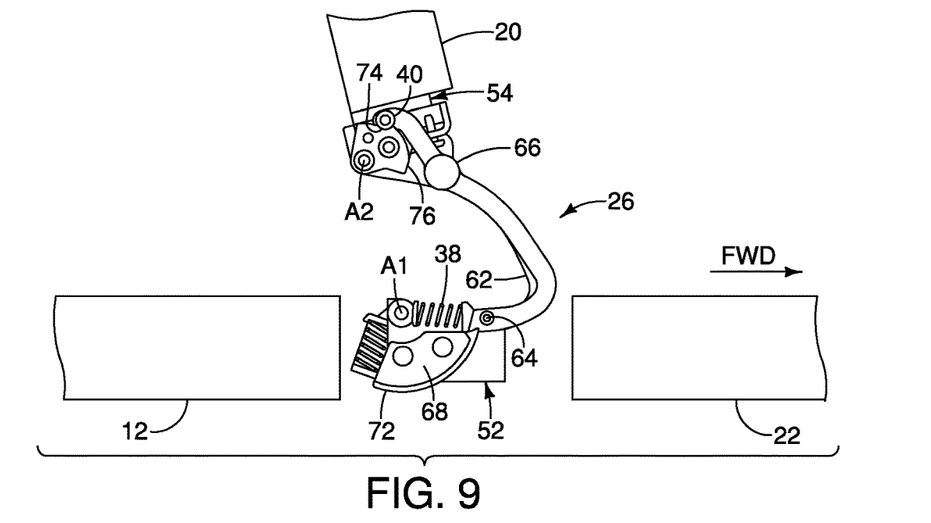
FIG. 9 is a top plan view of the adjustable hinge assembly with the closure panel in a partially open position.
Figure 10:
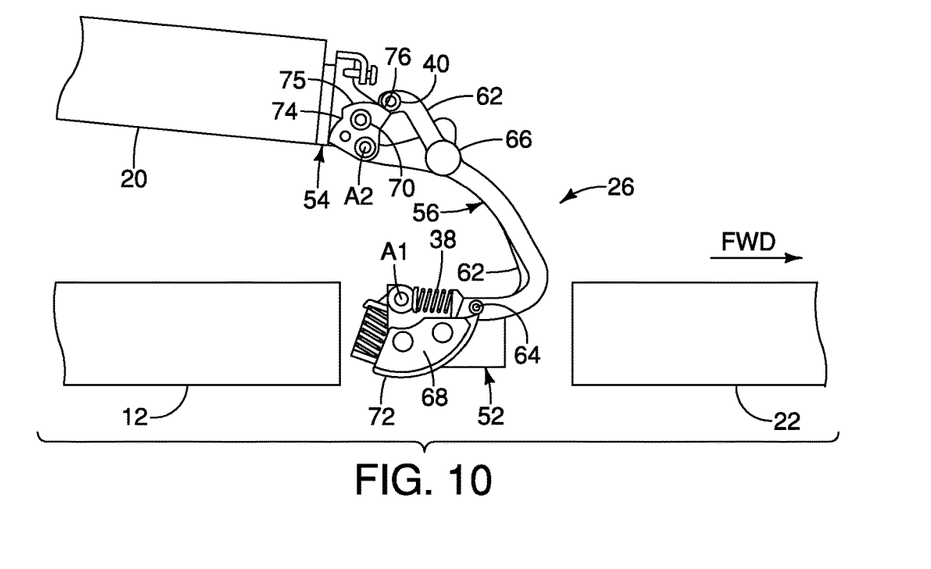
FIG. 10 is a top plan view of the adjustable hinge assembly with the closure panel in a fully open position.

As shown in FIGS. 1-3 and 8-10, the adjustable hinge assembly 26 pivotally connects the rear closure panel 20 to the rear closure panel mounting pillar 24. Thus, the rear closure panel 20 is swingably mounted to the rear closure panel mounting pillar 24 of the vehicle side body portion 16 of the vehicle body 12 to move between a closed position (FIG. 8) and a fully open position (FIG. 10). The adjustable hinge assembly 26 is configured such that the closure panel 20 can be maintained in an intermediate position (FIG. 9) between the closed and fully open positions. Vertically spaced apart openings 28 in the rear closure panel mounting pillar 24 accommodate movement of the adjustable hinge assembly 26. In the closed position, the rear closure panel 20 is disposed within the door ledge 22 of the side body portion 16. Preferably, the adjustable hinge assembly 26 has a double pivot pin arrangement that is configured and arranged such that the rear closure panel 20 swings to a fully open position that is approximately 170 degrees from the closed position, as shown in FIGS. 3 and 10. More preferably, the adjustable hinge assembly 26 is configured and arranged such that the rear closure panel 20 is swingably mounted to the closure panel mounting pillar 24 for movement between the closed position to a first, or intermediate, open position in which the door pivots approximately 100 degrees relative to the closed position about a first vertical pivot axis A1 as shown in FIG. 9. After reaching the first open position, the adjustable hinge assembly 26 is configured such that the rear closure panel 20 then pivots about a second vertical pivot axis A2 to a second, or fully, open position, such that the rear closure panel 20 opens to approximately 170 degrees relative to the closed position as seen in FIG. 10. In the illustrated embodiment, the rear closure panel 20 preferably pivots approximately 170 degrees when the rear closure panel 20 is pivoted from the closed position to the fully opened position. Accordingly, the first pivot axis A1 provides approximately 100 degrees of pivotal movement, i.e., from 0 to approximately 100 degrees, and the second pivot axis A2 provides approximately 70 degrees of pivotal movement, i.e., from approximately 100 degrees to approximately 170 degrees.

Figure 4:
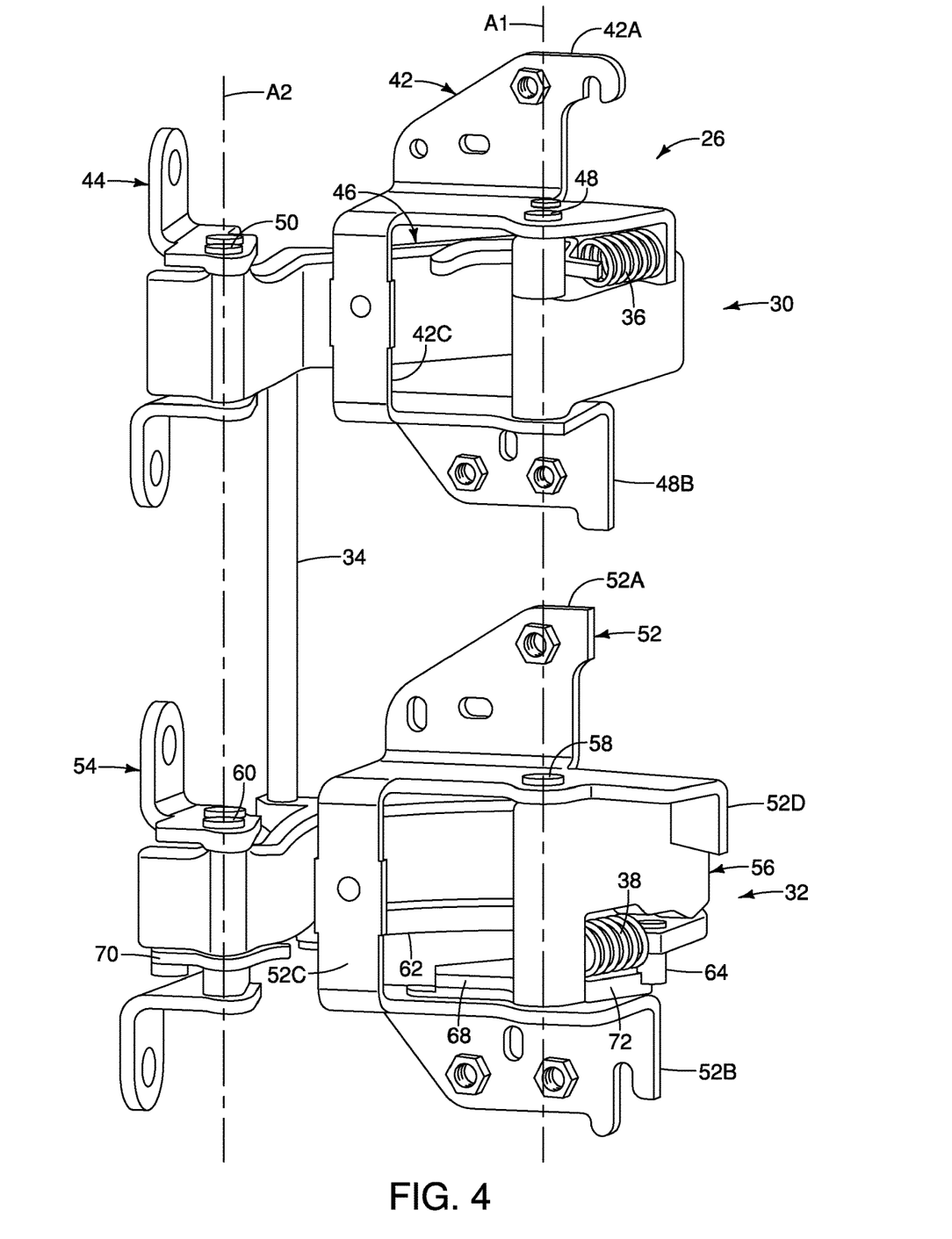
FIG. 4 is a rear perspective view of the adjustable hinge assembly of FIG. 3.
Figure 5:
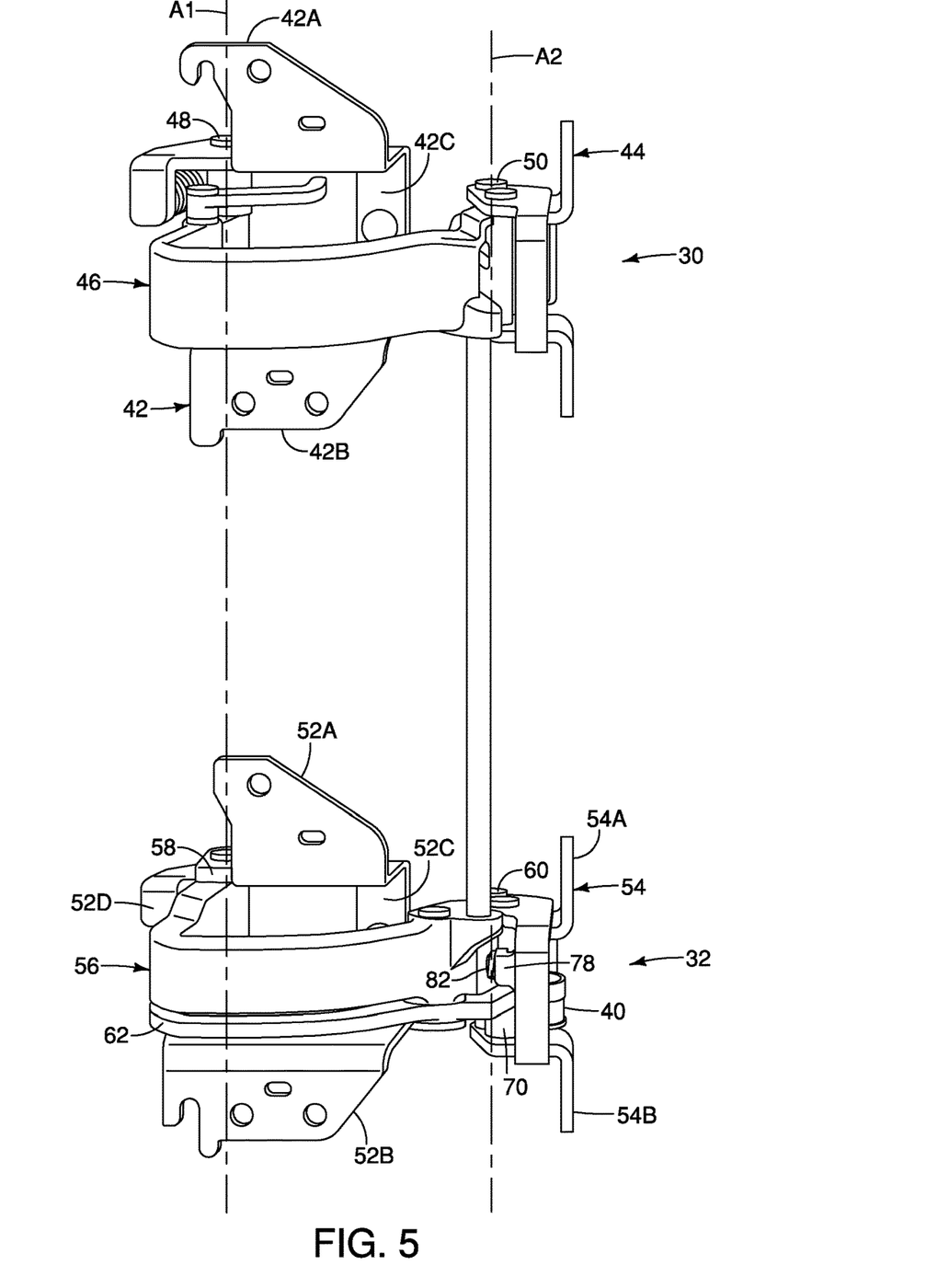
FIG. 5 is a front perspective view of the adjustable hinge assembly of FIG. 4.
Figure 6:
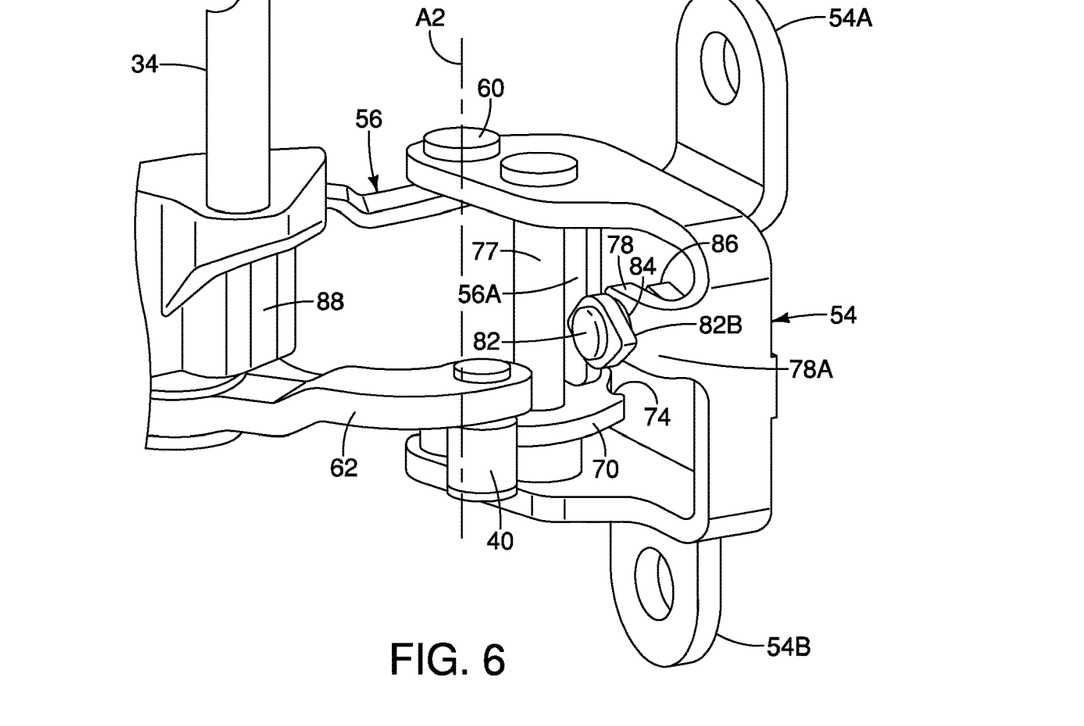
FIG. 6 is an enlarged perspective view of a closure panel mounting member of the adjustable hinge assembly of FIG. 5.

In the illustrated exemplary embodiment shown in FIGS. 4 to 6, the adjustable hinge assembly 26 basically includes an upper hinge 30, a lower hinge 32, and a torsion bar 34 that interconnects the upper and lower hinges 30 and 32. The adjustable hinge assembly 26 also preferably includes upper and lower coiled tension springs 36 and 38 coupled to the upper and lower hinges 30 and 32, respectively, and a roller mechanism 40 coupled to the lower hinge 32. The coiled tension springs 36 and 38 apply an urging force that biases the rear closure panel 20 to a closed position until the door is opened a predetermined amount, while the roller mechanism 40 overrideably retains the rear closure panel 20 in the first open position (approximately 100 degrees) until a predetermined pivoting force is applied to the adjustable hinge assembly 26 that overcomes a holding force of the roller mechanism 40, as explained below. Thus, the roller mechanism 40 is configured and arranged to stop the rear closure panel 20 in the first open position (approximately 100 degrees) so that the rear closure panel 20 does not readily pivot about the second pivot axis A2. Rather, an additional pivoting force needs to be applied to the rear closure panel 20 to cause the roller mechanism 40 to release the lower hinge 32 so that the rear closure panel 20 can freely pivot about the second pivot axis A2.

The adjustable hinge assembly 26 is a hidden hinge that is not visible when the rear closure panel 26 is in the closed position. Thus, in the illustrated exemplary embodiment, the adjustable hinge assembly 26 is configured and arranged such that a majority of the upper and lower hinges 32 and 32 are disposed within a hollow interior space (behind the vertically spaced openings 28) of the door mounting pillar 24 when the rear closure panel 20 is in the closed position, and a majority of the upper and lower hinges 30 and 32 are disposed outside (in front of the vertically spaced openings 28) of the hollow interior space of the door mounting pillar 24 when the rear closure panel 20 is in the fully open position.

As shown in FIGS. 4 and 5, the upper hinge 30 basically includes an upper body mounting member 42, an upper closure panel mounting member 44 and an upper hinge connecting arm 46 extending between the upper body mounting member 42 and the upper closure panel mounting member 44. The upper body mounting member 42 is fixedly coupled to the mounting pillar 24 by upper fasteners or bolts received by fastener openings therein. The upper closure panel mounting member 44 is fixedly coupled to the closure panel 20 by a pair of mounting fasteners or bolts received by fastener openings therein. The hinge connecting arm 46 is pivotally connected at a first end to the upper body mounting member 42 by a first pivot pin 48 that lies on the first vertical pivot axis A1 of the adjustable hinge assembly 26. The second end of the upper hinge connecting arm 46 is pivotally connected to the upper closure panel mounting member 44 by a second pivot pin 50 that is arranged on the second pivot axis A2 of the adjustable hinge assembly 26.

The upper body mounting member 42 is preferably a one piece unitary member constructed out of a rigid metallic material. The upper body mounting member 42 has a pair of mounting flanges 42A and 42B connected together by a U-shaped central portion 42C. Each of the mounting flanges 42A and 42B has at least one mounting hole to receive a fastener to fixedly mount the upper hinge 30 to the mounting pillar 24. As shown in FIG. 4, the mounting flange 42A has one mounting hole, and the mounting flange 42B has two mounting holes.

The U-shaped central portion 42C of the upper body mounting member 42 has a pair of axially aligned holes that support the first pivot pin 48 of the first end of the upper hinge connecting arm 46. Thus, the upper hinge connecting arm 46 is located in the area between the pair of mounting flanges 42A and 24B. Further, the upper hinge connecting arm 46 is configured and arranged to pivot relative to the upper body mounting member 42 about the first vertical pivot axis A1 of the adjustable hinge assembly 26. The second end of the upper hinge connecting arm 46 is pivotally connected to the upper closure panel mounting member 44 by the second pivot pin 50 that is arranged on the second pivot axis A2 of the adjustable hinge assembly 26. The upper closure panel mounting member 44 is preferably constructed as a one piece unitary member constructed of a rigid metallic material.

The upper hinge connecting arm 46 is preferably constructed of a one piece, unitary member that has a pair of end portions for pivotally receiving the pivot pins 48 and 50 therein. The upper hinge connecting arm 46 has an upper end of the torsion bar 34 fixedly coupled thereto at a point between the pivot pins 48 and 50.

As seen in FIGS. 4 and 5, the lower hinge 32 basically includes a lower body mounting member 52, a lower closure panel mounting member 54, and a lower hinge connecting arm 56. Basically, the lower hinge 32 is substantially similar to the upper hinge 30, except for the additional structure described below.

The lower body mounting member 52 is fixedly coupled to the rear mounting pillar 24 by a plurality of mounting fasteners or bolts. The lower closure panel mounting member 54 is fixedly coupled to the closure panel 20 by a plurality of mounting fasteners or bolts. The lower hinge connecting arm 56 is pivotally coupled at a first end to the lower body mounting member 52 by a first pivot pin 58 that lies on the first vertical pivot axis A1 of the adjustable hinge assembly 26. The second end of the lower hinge connecting arm 56 is pivotally connected to the lower closure panel mounting member 54 by a second pivot pin 60 that is arranged on the second pivot axis A2 of the adjustable hinge assembly 26.

The lower body mounting member 52 is preferably a one piece unitary member constructed out of a rigid metallic material. In particular, the lower body mounting member 52 has a pair of mounting flanges 52A and 52B connected together by a U shaped central portion 52C. Each of the mounting flanges 52A and 52B has at least one mounting hole to receive a fastener to fixedly mount the lower hinge 32 to the mounting pillar 24. As shown in FIG. 4, the mounting flange 52A has one mounting hole, and the mounting flange 42B has two mounting holes.

The U shaped central portion 52C of the lower body mounting member 52 has a pair of axially aligned holes that support the first pivot pin 58 of the first end of the lower hinge connecting arm 56. Thus, the lower hinge connecting arm 56 is located in the area between the pair of mounting flanges 52A and 52B. Further, the lower hinge connecting arm 56 is configured and arranged to pivot relative to the lower body mounting member 52 about the first vertical pivot axis A1 of the adjustable hinge assembly 26. The second end of the lower hinge connecting arm 56 is pivotally connected to the lower closure panel mounting member 54 by the second pivot pin 60 that is arranged on the second pivot axis A2 of the adjustable hinge assembly 26.

As shown in FIGS. 4-6, the lower closure panel mounting member 54 is substantially U-shaped. First and second mounting members 54A and 54B extend in opposite directions from first and second legs of the substantially U-shaped member. The first and second mounting members 54A and 54B preferably extend in a direction parallel to the first and second pivot axes, A1 and A2. A fastener hole disposed in each of the first and second mounting members 54A and 54B receives a fastener to mount the lower closure panel mounting member 54 to the closure panel 20. The lower closure panel mounting member 54 is preferably constructed as a one piece unitary member constructed of a rigid metallic material.

As seen in FIGS. 4 and 5, the lower hinge connecting arm 56 is preferably constructed of a one piece, unitary member that has a pair of end portions for pivotally receiving the pivot pins 58 and 60 therein. The lower hinge connecting arm 56 has the lower end of the torsion bar 34 fixedly coupled thereto at a point between the pivot pins 58 and 60.

The torsion bar 34 is preferably constructed of a hard rigid metallic material and extends between the upper and lower hinge connecting arms 46 and 56. The opposing ends of the torsion bar 34 are fixedly coupled to the upper and lower hinge connecting arms 46 and 56 in any suitable manner, such as by welding.

As shown in FIG. 4, a cam arm 62 is connected by the spring 38 at a first end to the lower body mounting member 52. The first roller mechanism 40 is connected at the second end of the cam arm 62, as shown in FIG. 6. A second roller mechanism 64 is connected at a first end of the cam arm 62. The cam arm 62 is pivotally connected to the hinge connecting arm 56 by a pin 66, thereby allowing movement of the cam arm 62 with respect to the hinge connecting arm 56. As shown in FIG. 4, the cam arm 62 is disposed vertically beneath the hinge connecting arm 56 in the vertical direction.

A first cam member 68 is mounted on the lower body mounting member 52. A second cam member 70 is mounted on the lower closure panel mounting member 54. The second roller mechanism 64 engages the first cam member 68 and the first roller mechanism 40 engages the second cam member 70, as shown in FIGS. 8-10. The first cam member 68 has a groove 72 extending along an outer peripheral surface thereof. The second roller mechanism 64 moves from a first end of the groove 72, as shown in FIG. 8, to a second end of the groove 72, as shown in FIG. 9, when the closure panel 20 moves from the closed position (FIG. 8) to the first open, or intermediate, position (FIG. 9). The hinge connecting arm 56 contacts the U shaped central portion 52C of the lower body mounting member 52 (FIG. 5) to stop further pivotal movement of the hinge connecting arm 56 when the closure panel 20 moves from the closed position (FIG. 8) to the first open, or intermediate, position (FIG. 9).

The first roller mechanism 40 engages a first notch 74 in an outer peripheral surface 75 of the second cam member 70, as shown in FIG. 8, when the closure panel 20 is in the closed position. Movement of the closure panel 20 from the closed position (FIG. 8) to the intermediate position (FIG. 9) does not result in movement of the lower closure panel mounting member 54 because the first roller mechanism 40 is securely received by the first notch 74 of the second cam member 70. The spring 38 biases the cam arm 62 such that the first roller mechanism 40 is engaged with the first notch 74 of the second cam member 70. The retention force with which the first roller mechanism 40 is received by the first notch 74 of the second cam member 70 is overcome by applying force to the closure panel 20, thereby causing the first roller mechanism 40 to disengage the notch 74 of the second cam member and ride along the outer peripheral surface 75 of the second cam member until the first roller mechanism 40 engages a second notch therein 76. The spring 38 biases the first roller mechanism 40 into engagement with the first and second notches 74 and 76, thereby requiring force to be applied to the closure panel 20 to further move the closure panel 20. The pin 66 provides a pivotal connection between the cam arm 62 and the lower hinge connecting member 56, thereby providing movement of the cam arm 62 relative to the hinge connecting member 56 such that the first roller mechanism 40 can be engaged with and disengaged from the first and second notches 74 and 76 of the second cam member 70.

A stop pin 75 extends between the second cam member 70 and an upper leg of the lower closure panel mounting member 54, as shown in FIG. 6. The stop pin 75 moves with the lower closure panel mounting member 54 and contacts a stop surface 56A of the hinge connecting arm 56 to stop further pivotal movement of the lower closure panel mounting member 54. The first roller mechanism 40 engages the second notch 76 of the second cam member 70 when the stop pin 75 engages the stop surface 56A of the hinge connecting arm 56.

Figure 7:
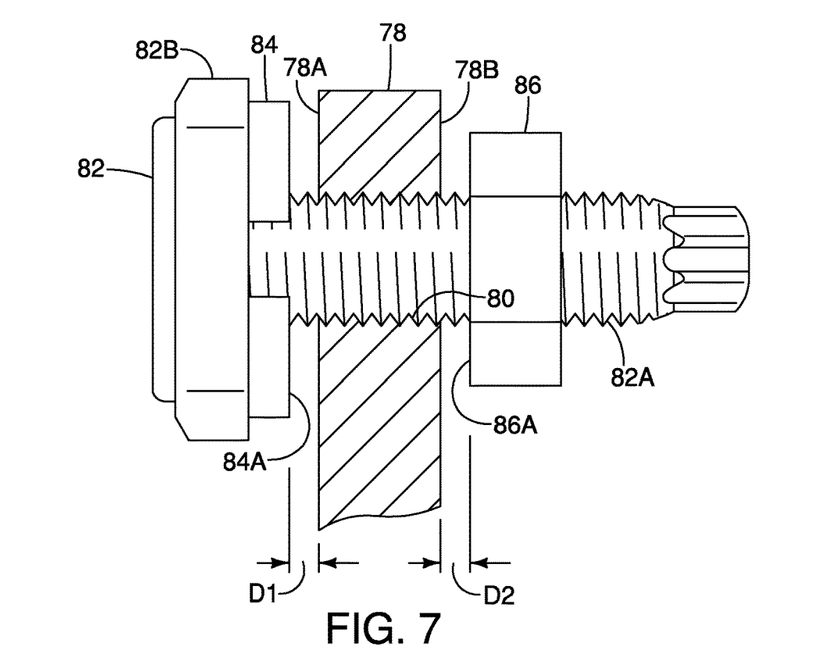
FIG. 7 is a top plan view of a first fastening member of the adjustable hinge assembly of FIG. 3.

As shown in FIGS. 6 and 7, an adjustment member 78 extends outwardly from the lower closure panel mounting member 54. The adjustment member 78 preferably extends in a direction substantially perpendicular to the directions in which the first and second mounting members 54A and 54B extend, as shown in FIG. 6. The adjustment member 78 preferably extends substantially perpendicularly to the first and second pivot axes A1 and A2. The adjustment member 78 is extends from a base portion of the substantially U-shaped member, such that the adjustment member 78 is disposed between the first and second mounting members 54A and 54B. The adjustment member 78 has a first surface 78A facing the hinge connecting arm 56 when the lower closure panel mounting member 54 is in the closed position shown in FIG. 8. A second surface 78B of the adjustment member 78 faces away from hinge connecting arm 56 when the lower closure panel mounting member 54 is in the closed position.

Figure 12:
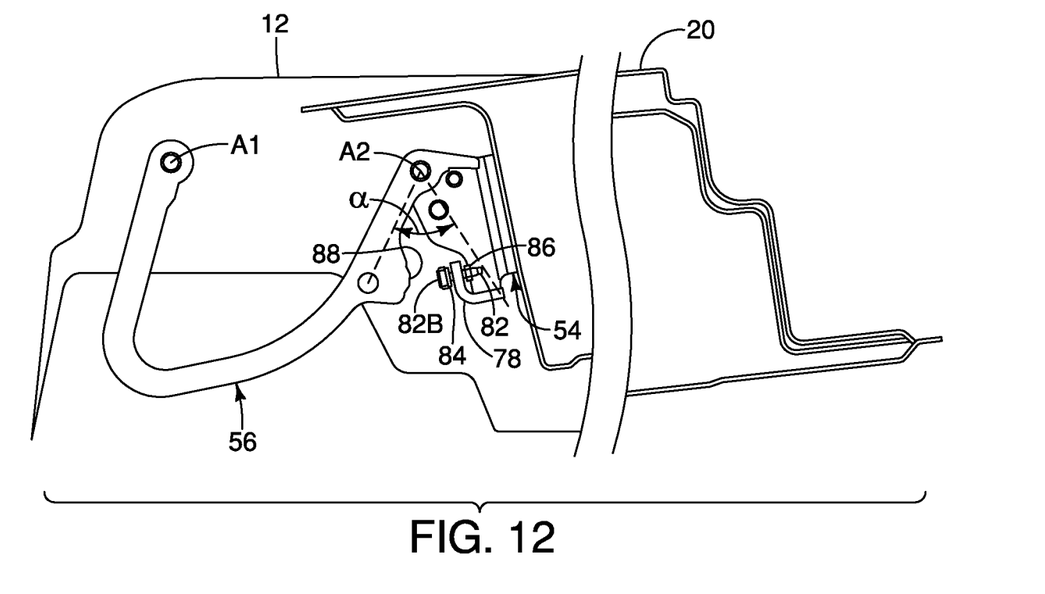
FIG. 12 is a top plan view of the first fastening member of FIG. 11 in which the first fastening member is moved in a first direction.
Figure 13:
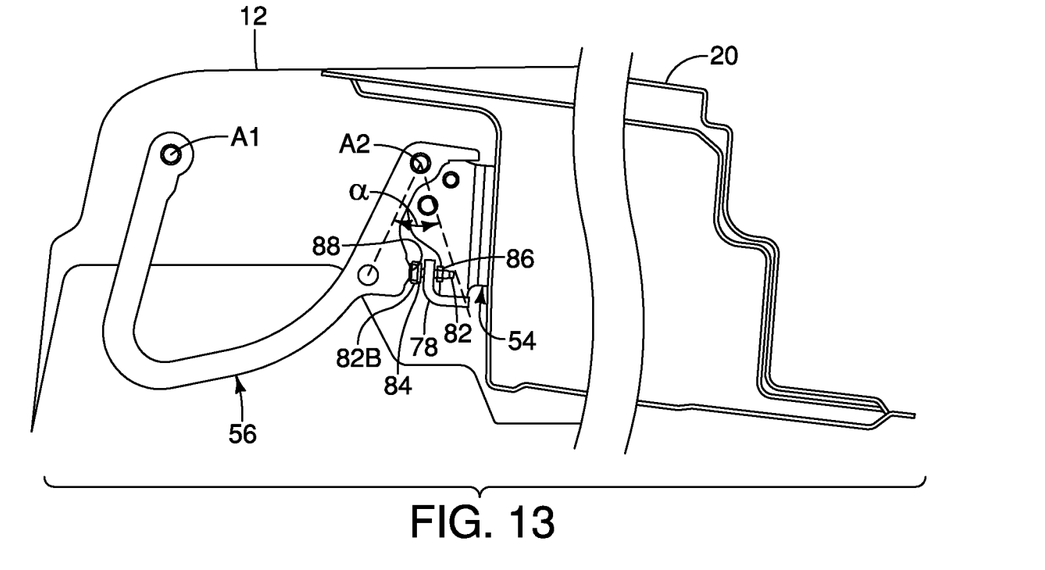
FIG. 13 is a top plan view of the first fastening member of FIGS. 11 and 12 in which the first fastening member is moved in a second direction.

A first fastener opening 80 extends from the first surface 78A to the second surface 78B of the adjustment member 78, as shown in FIG. 7. The first fastener opening 80 movably receives a first fastening member 82 therein. The threads of fastening member 82 can be received by cooperating threads of the first fastener opening 80 of the adjustment member 78. Movement of the first fastening member 82 in the first fastener opening 80 with respect to the adjustment member 78 adjusts the flushness of the closure panel 20 with the body 24 of the vehicle, as shown in FIGS. 11-13.

A first stop member 84 is disposed on a shaft 82A of the first fastening member 82 between a fastener head 82B and the first surface 78A of the adjustment member 78. A first predetermined distance D1 separates an inner surface 84A of the first stop member 84 and the first surface 78A of the adjustment member 78 of the closure panel mounting member 54. The first stop member 84 is disposed on the shaft 82A of the first fastening member 82 after the first fastening member is received by the adjustment member 78. Accordingly, the first stop member 84 is preferably a C-shaped member, such as a clip or spacer, to facilitate disposing the first stop member 84 on the first fastening member shaft 82A. The first stop member 84 is fixedly attached to the first fastening member shaft 82A, such that the first stop member 84 rotates with rotation of the first fastening member 82. Accordingly, rotation of the first fastening member 82 in a first direction (i.e., a negative direction as shown in FIG. 11) toward the adjustment member 78 is limited to the predetermined distance D1.

A second stop member 86 is disposed on the shaft 82A of the first fastening member 82 on an opposite side of the adjustment member 78 with respect to the first stop member 84. A second predetermined distance D2 separates an inner surface 86A of the second stop member 86 and the second surface 78B of the adjustment member 78 of the closure panel mounting member 54. Because access to the free end of the first fastening member shaft 82A is not prevented after installation, the second stop member 86 can be any suitable member, such as a lock tight nut. A lock tight nut is a nut held in place with Loctite™. The second stop member 86 is fixedly attached to the first fastening member shaft 82A, such that the second stop member 86 rotates with rotation of the first fastening member 82. Accordingly, rotation of the first fastening member 86 in a second direction (i.e., a positive direction as shown in FIG. 11) away from the adjustment member 78 is limited to the predetermined distance D2. As shown in FIGS. 7 and 11, the second direction is substantially opposite to the first direction.

Figure 11:
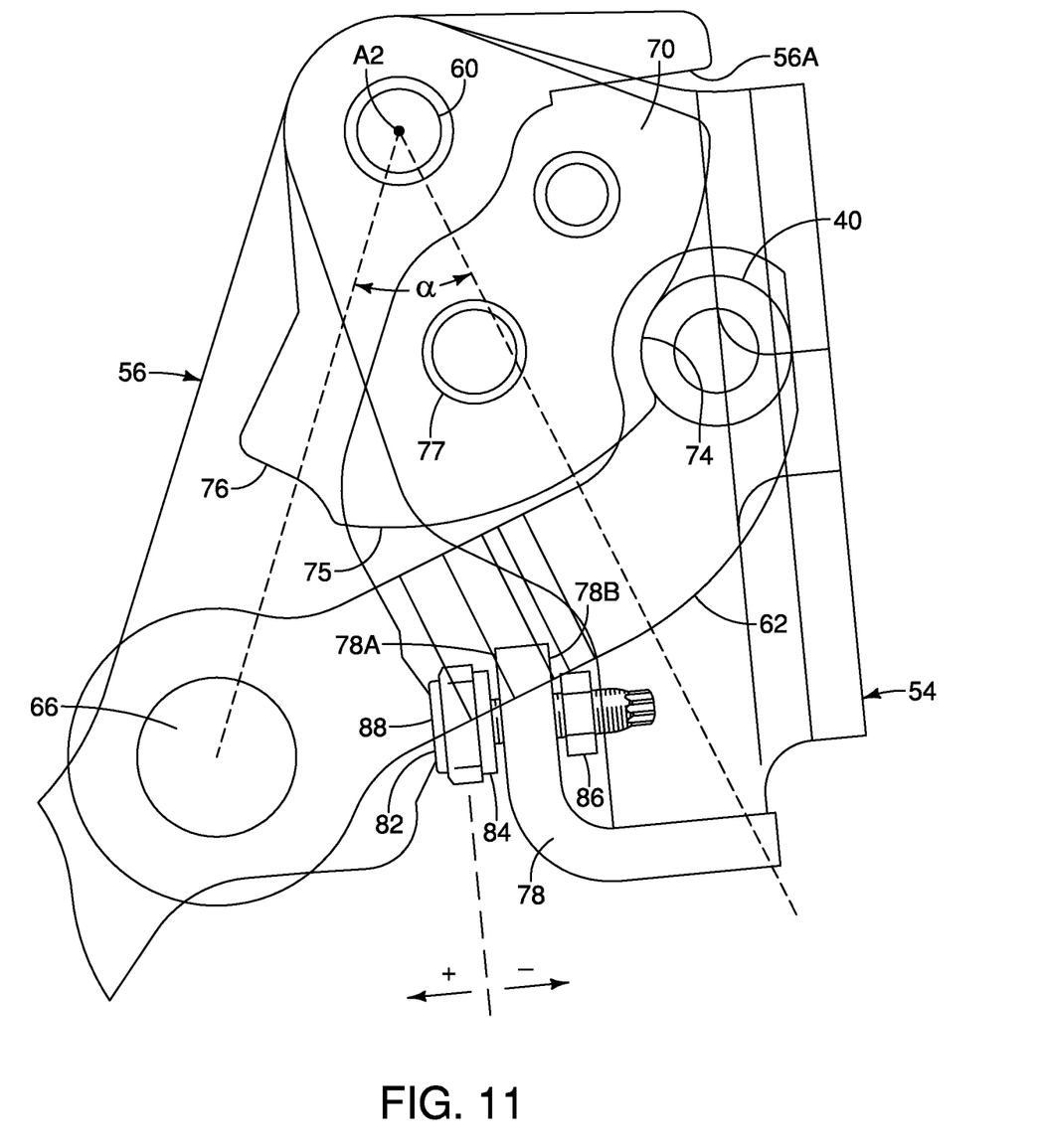
FIG. 11 is a top plan view of the first fastening member of FIG. 7.

As shown in FIG. 11, a hinge angle α is determined by the position of the first fastening member 82 with respect to the adjustment tab 78 of the closure panel mounting member 54. The vertex of the hinge angle α is the second pivot axis A2 passing through the pivot pin 60. A first side of the hinge angle passes through the pin 66. The second side of the hinge angle passes through a rear corner of the adjustment tab 78. The size of the hinge angle α is controlled by the position of the first fastening member 82 with respect to the adjustment tab 78 of the closure panel mounting member 54.

As shown in FIG. 13, the flushness condition of closure panel 20 with respect to body 12 is seen when closure panel 20 is in the closed position in which the fastening member 82 contacts a surface abutment member 88 (FIGS. 6 and 11-13) of the hinge connecting arm 56. When the closure panel 20 is too far down in FIG. 13 or inboard, the closure panel 20 can be moved up or outboard to make the closure panel 20 flush with the body 12. When the closure panel 20 is too far up in FIG. 13 or outboard, the closure panel 20 can be moved down or inboard to make the closure panel 20 flush with the body 12. The fastening member 82 allows the flushness of closure panel 20 to be adjusted. When the flushness needs to be adjusted with the fastening member 82, the closure panel 20 is moved to the open position, the fastening member 82 is adjusted and then the closure panel 20 is moved to the closed position to determine whether the change in flushness is acceptable. This process can be repeated until the desired flushness is obtained.

The flushness of the closure panel 20 in the closed position can be adjusted by moving the fastening member 82 right or left with respect to adjustment member 78. FIG. 13 shows the fastening member 82 contacting the surface abutment member 88 of the hinge connecting arm 56 when the closure panel 20 is in the closed position. Moving the fastening member 82 in the second direction (i.e., a positive direction or left) creates more distance between the left end of fastening member 82 and the left side of adjustment member 78 and pushes closure panel 20 up in FIG. 13 or outboard. This adjustment increases the angle α. Moving the fastening member 82 in the first direction (i.e., a negative direction or right) creates less distance between the left end of fastening member 82 and the left side of adjustment member 78 and pulls closure panel 20 down in FIG. 13 or inboard. This adjustment decreases the angle α.

Because minimal adjustments of the first fastening member 82 are necessary to adjust flushness of the closure panel 20 with the vehicle body 12, the first and second stop members 84 and 86 are disposed to limit movement of the first fastening member 82, thereby preventing over-adjusting of the position of the closure panel 20. The first and second predetermined distances D1 and D2 can be any suitable distance to substantially prevent over-adjustment of the position of the closure panel 20, although the first and second predetermined distances D1 and D2 are preferably approximately 1 mm. Although the first and second predetermined distances D1 and D2 are preferably approximately 1 mm, the first and second predetermined distances can be different distances and can be different from each other.

The first fastening member 82 is shown disposed on the lower closure panel mounting member 54. Alternatively, the first fastening member 82 can be disposed on the upper closure panel mounting member 44.

Figure 14:
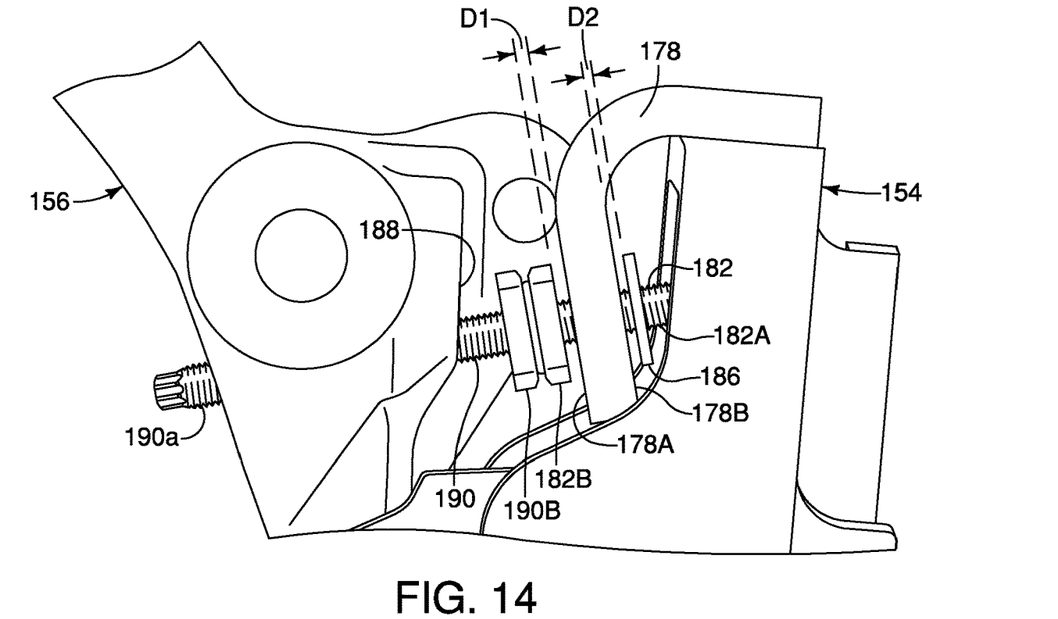
FIG. 14 is a bottom plan view of a first fastening member of the adjustable hinge assembly in accordance with a second exemplary embodiment of the present invention.

As shown in FIG. 14, an adjustable hinge assembly in accordance with a second exemplary embodiment of the present invention is substantially similar to the adjustable hinge assembly 26 of the first exemplary embodiment except for the differences described below. Similar parts are identified with similar reference numerals, except increased by 100 (i.e., 1xx, accordingly).

In lieu of a first stop member disposed on shaft 182A of the first fastening member 182, the first stop member is a second fastening member 190 received by the hinge connecting arm 156 as shown in FIG. 14. An opening for the second fastening member 190 is disposed in the abutment surface 188 and preferably extends through the hinge connecting arm 156 in an axial direction substantially parallel to an axial direction of the first fastening member 182 when the closure panel is in the closed position. Accordingly, the head 182B of the first fastening member 182 contacts a head 190A of the second fastening member 190 when the closure panel is in the closed position.

A shaft 190A of the second fastening member 190 is adjusted in the hinge connecting arm 156 to set the predetermined distance D1 between the head 182B of the first fastening member 182 and the first surface 178A of the adjustment tab 178 to a desired distance. Preferably, the first predetermined distance D1 is approximately 1 mm. Accordingly, the second fastening member 190 limits the movement of the first fastening member 182 in a direction toward the adjustment tab 178 of the closure panel mounting member 154.

The second stop member 186 is any suitable member, such as a lock tight nut or a C-shaped clamp or washer, disposed on the shaft 182A of the first fastening member 182. The second stop member 186 is fixedly attached to the first fastening member to set the second predetermined distance D2 to a desired distance. The second predetermined distance D2 can be any suitable distance, but preferably is approximately 1 mm. The second stop member 186 functions substantially similarly to the second stop member 82 described in accordance with the first exemplary embodiment.

The first and second fastening members 182 and 190 are shown disposed on the lower closure panel mounting member 54. Alternatively, the first and second fastening members 182 and 190 can be disposed on the upper closure panel mounting member.

Figure 15:
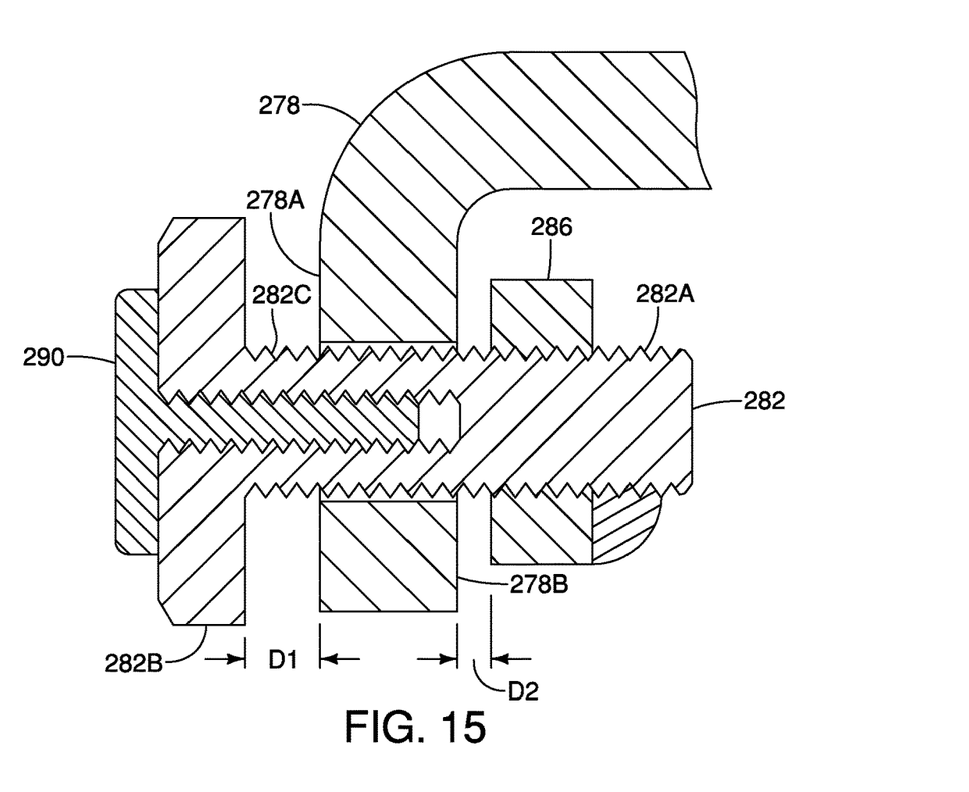
FIG. 15 is a bottom plan view of a first fastening member of the adjustable hinge assembly in accordance with a third exemplary embodiment of the present invention.

As shown in FIG. 15, an adjustable hinge assembly in accordance with a second exemplary embodiment of the present invention is substantially similar to the adjustable hinge assembly 26 of the first exemplary embodiment except for the differences described below. Similar parts are identified with similar reference numerals, except increased by 200 (i.e., 2xx, accordingly).

A bore 282C extends in an axial direction from the head 282B of the first fastening member 282 into the shaft 282A, as shown in FIG. 15. The bore 282C does not extend through an entirety of the shaft 282A. A second fastening member 290 is received by the bore 282C, and is fixedly attached to the first fastening member 282. Accordingly, the first fastening member 282 is limited to movement in the first direction toward the adjustment tab 178 of the closure panel mounting member by the predetermined distance D1. The predetermined distance D1 can be any suitable distance, but preferably is approximately 1 mm.

The second stop member 286 is any suitable member, such as a lock tight nut or a C-shaped clamp or washer, disposed on the shaft 282A of the first fastening member 282. Alternatively, as shown in FIG. 15, the second stop member 286 is welded, such as a mig weld, to the shaft 282A of the first fastening member 282 such that the second stop member 286 rotates with rotation of the first fastening member 282. The second stop member 286 is fixedly attached to the first fastening member 282 to set the second predetermined distance D2 to a desired distance. The second predetermined distance D2 can be any suitable distance, but preferably is approximately 1 mm. The second stop member 286 functions substantially similarly to the second stop member 82 described in accordance with the first exemplary embodiment.

The first and second fastening members 282 and 290 are shown disposed on the lower closure panel mounting member. Alternatively, the first and second fastening members 282 and 290 can be disposed on the upper closure panel mounting member.

Figure 16:
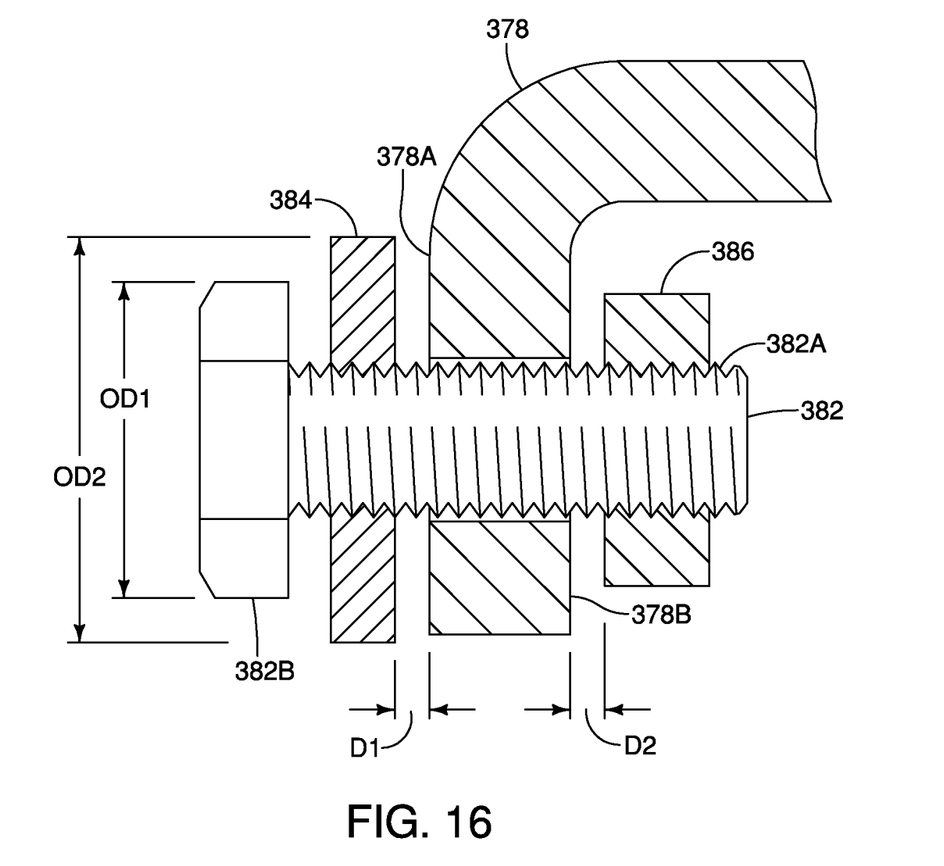
FIG. 16 is a bottom plan view of a first fastening member of the adjustable hinge assembly in accordance with a fourth exemplary embodiment of the present invention.

As shown in FIG. 16, an adjustable hinge assembly in accordance with a second exemplary embodiment of the present invention is substantially similar to the adjustable hinge assembly 26 of the first exemplary embodiment except for the differences described below. Similar parts are identified with similar reference numerals, except increased by 300 (i.e., 3xx, accordingly).

The first stop member 384 is an oversized nut fixedly attached to the shaft 382A of the first fastening member 382A between the head 382B and the first surface 378A of the adjustment tab 378, as shown in FIG. 16. An outer diameter OD1 of the head 382B of the first fastening member 382 is smaller than an outer diameter OD2 of the first stop member 384. Accordingly, the first stop member 384 is easily accessible to move the first fastening member 382. The first stop member 382 is fixedly attached to the first fastening member 382 to set the first predetermined distance D1 to a desired distance. The first predetermined distance D1 can be any suitable distance, but preferably is approximately 1 mm. The first stop member 382 functions substantially similarly to the first stop member 82 described in accordance with the first exemplary embodiment.

The second stop member 386 is any suitable member, such as a lock tight nut or a C-shaped clamp or washer, disposed on the shaft 382A of the first fastening member 382. The second stop member 386 is fixedly attached to the first fastening member 382 to set the second predetermined distance D2 to a desired distance. The second predetermined distance D2 can be any suitable distance, but preferably is approximately 1 mm. The second stop member 386 functions substantially similarly to the second stop member 82 described in accordance with the first exemplary embodiment.

The first fastening member 382 is shown disposed on the lower closure panel mounting member. Alternatively, the first fastening member 282 can be disposed on the upper closure panel mounting member.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above exemplary embodiment, the following directional terms "forward", "rearward", "above", "downward", "vertical", "horizontal", "below" and "transverse" as well as any other similar directional terms refer to those directions of a vehicle.

The terms of degree such as "substantially", "generally", "about" and "approximately" as used herein mean a reasonable amount of deviation of the modified term such that the end result is not significantly changed.

While only selected exemplary embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another exemplary embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature. Thus, the foregoing descriptions of the exemplary embodiments according to the present invention are provided for illustration only, and not for the purpose of limiting the invention as defined by the appended claims and their equivalents.

What is claimed is:

1. A hinge assembly for a vehicle closure panel, comprising:
    a body mounting member configured to mount the hinge assembly to a vehicle body;
    a closure panel mounting member configured to mount the hinge assembly to the vehicle closure panel;
    a hinge connecting arm pivotally connected by a first pivotal connection at a first end to the body mounting member and pivotally connected by a second pivotal connection at a second end to the closure panel mounting member;
    a first fastening member movably received by the closure panel mounting member the first fastening member being configured to not be directly connected to the vehicle body or to the vehicle closure panel;
    a first stop member to limit movement of the first fastening member in a first direction toward the closure panel mounting member; and
    a second stop member to limit movement of the first fastening member in a second direction away from the closure panel mounting member, the second direction being different from the first direction.

2. The hinge assembly for a vehicle closure panel according to claim 1, wherein
    the first stop member and the second stop member are spaced predetermined distances from the closure panel mounting member.

3. The hinge assembly for a vehicle closure panel according to claim 1, wherein
    the first stop member is a spacer fixedly attached to the first fastening member.

4. The hinge assembly for a vehicle closure panel according to claim 3, wherein
    the second stop member is a nut fixedly attached to the first fastening member.

5. The hinge assembly for a vehicle closure panel according to claim 4, wherein
    the first stop member and the second stop member are disposed on opposite sides of the closure panel mounting member.

6. The hinge assembly for a vehicle closure panel according to claim 1, wherein
    the first stop member is a second fastening member connected to the hinge connecting arm.

7. The hinge assembly for a vehicle closure panel according to claim 6, wherein
    the second stop member is a nut fixedly attached to the first fastening member.

8. The hinge assembly for a vehicle closure panel according to claim 1, wherein
    the first stop member is a second fastening member received by the first fastening member.

9. The hinge assembly for a vehicle closure panel according to claim 8, wherein
    the second stop member is a nut fixedly attached to the first fastening member.

10. The hinge assembly for a vehicle closure panel according to claim 1, wherein
    the first stop member is a nut having an outer diameter larger than an outer diameter of the first fastening member.

11. The hinge assembly for a vehicle closure panel according to claim 10, wherein
    the second stop member is a nut fixedly attached to the first fastening member.

12. The hinge assembly for a vehicle closure panel according to claim 1, wherein
    the hinge connecting arm rotates approximately one hundred degrees about the first pivotal connection with respect to the body mounting member.

13. The hinge assembly for a vehicle closure panel according to claim 1, wherein
    the closure panel mounting member rotates approximately seventy degrees about the second pivotal connection with respect to the hinge connecting arm.

14. A vehicle body structure, comprising:
    a vehicle body;
    a closure panel pivotally mounted to the vehicle body; and
    a hinge assembly for pivotally mounting the closure panel to the vehicle body, the hinge assembly including a body mounting member configured to mount the hinge assembly to the vehicle body;

a closure panel mounting member configured to mount the hinge assembly to the closure panel;

a hinge connecting arm pivotally connected by a first pivotal connection at a first end to the body mounting member and pivotally connected by a second pivotal connection at a second end to the closure panel mounting member;

a first fastening member movably received by the closure panel mounting member such that movement of the first fastening member with respect to the closure panel mounting member adjusts a position of the closure panel with respect to the vehicle body, the first fastening member not being directly connected to the vehicle body or to the closure panel;

a first stop member to limit movement of the first fastening member in a first direction toward the closure panel mounting member; and a second stop member to limit movement of the first fastening member in a second direction away from the closure panel mounting member, the second direction being different from the first direction.

15. The vehicle body structure according to claim 14, wherein the first stop member and the second stop member are spaced predetermined distances from the closure panel mounting member.

16. The vehicle body structure according to claim 14, wherein the first stop member is disposed on the first fastening member.

17. The vehicle body structure according to claim 16, wherein the second stop member is disposed on the first fastening member on an opposite side of the closure panel mounting member from the first stop member.

18. The vehicle body structure according to claim 14, wherein the first stop member is a second fastening member received by the hinge connecting arm, and the second stop member is a nut disposed on the first fastening member.

19. The vehicle body structure according to claim 14, wherein the first stop member is a second fastening member received by the first fastening member, and the second stop member is a nut disposed on the first fastening member.

20. The vehicle body structure according to claim 14, wherein the second direction is opposite to the first direction.

* * * * *